United States Patent
Gatlin et al.

(10) Patent No.: US 8,219,927 B2
(45) Date of Patent: Jul. 10, 2012

(54) REVEALING OF TRUNCATED CONTENT ON SCROLLABLE GRID

(75) Inventors: Kang Su Gatlin, Seattle, WA (US); Elyssa Cox, Redmond, WA (US); Rebecca Penick, Snohomish, WA (US); Erika Carlson, Bothell, WA (US); Anthony Young, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 12/349,388

(22) Filed: Jan. 6, 2009

(65) Prior Publication Data
US 2010/0175023 A1 Jul. 8, 2010

(51) Int. Cl.
*G06F 3/00* (2006.01)

(52) U.S. Cl. .......................... 715/788; 715/784

(58) Field of Classification Search .................. 715/788, 715/784
See application file for complete search history.

(56) References Cited

U.S. PATENT DOCUMENTS

| | | | |
|---|---|---|---|
| 5,119,079 A | 6/1992 | Hube et al. | |
| 6,271,835 B1 * | 8/2001 | Hoeksma | 345/168 |
| 6,377,285 B1 | 4/2002 | Doan et al. | |
| 6,839,575 B2 * | 1/2005 | Ostergaard | 455/566 |
| 7,032,181 B1 * | 4/2006 | Farcasiu | 715/764 |
| 7,117,441 B2 | 10/2006 | Allport | |
| 7,216,291 B2 * | 5/2007 | Kim | 715/227 |
| 7,257,776 B2 | 8/2007 | Bailey et al. | |
| 7,305,617 B2 | 12/2007 | McCully | |
| 7,725,815 B2 * | 5/2010 | Peters | 715/227 |
| 7,907,974 B2 * | 3/2011 | Brinda et al. | 455/566 |
| 2002/0013165 A1 | 1/2002 | Ostergaard | |
| 2003/0117427 A1 | 6/2003 | Haughawout et al. | |
| 2003/0217074 A1 | 11/2003 | Wallace | |
| 2005/0094207 A1 | 5/2005 | Lo et al. | |
| 2005/0251825 A1 | 11/2005 | Fukuda et al. | |
| 2006/0150078 A1 | 7/2006 | Brookler et al. | |
| 2006/0253775 A1 | 11/2006 | Ovetchkine et al. | |
| 2007/0130502 A1 | 6/2007 | Tolgu et al. | |
| 2009/0133063 A1 * | 5/2009 | Sparrell | 725/40 |

FOREIGN PATENT DOCUMENTS

| | | |
|---|---|---|
| KR | 100561608 B1 | 3/2006 |
| KR | 100616103 B1 | 8/2006 |

OTHER PUBLICATIONS

ISA Korea, International Search Report of PCT/US2009/066611, May 18, 2010, 4 pages.

(Continued)

*Primary Examiner* — William Bashore
*Assistant Examiner* — David Phantana Angkool
(74) *Attorney, Agent, or Firm* — Alleman Hall McCoy Russell & Tuttle LLP

(57) ABSTRACT

Various embodiments related to the revealing of truncated content on a scrollable grid are disclosed. One disclosed embodiment provides a computing device comprising a display, a processor, and memory comprising instructions executable by the processor to display a cell of a grid of content at a first, smaller size and display in the cell a content item that is truncated based upon the first, smaller size of the cell. The computing device is further configured to receive a request to scroll the grid, and scroll the grid on the display device. During scrolling, the size of the cell is increased to a second, larger size, and a revealing of a truncated portion of the content item is animated.

20 Claims, 4 Drawing Sheets

OTHER PUBLICATIONS

"User Interface Basics", retrieved at <<http://wireless.agilent.com/wireless/helpfiles/n7623b/user_interface_basics.htm>>, Aug. 16, 2005, pp. 14.

"User Manual IME Claims Data Cube", retrieved at <<http://www.iowamedicaidpdl.com/uploads/9h/HD/9hHDhxEZLrC7JXV1E1nf_Q/Using_the_IME_POS_Data_Cube.pdf>>, Nov. 28, 2008, pp. 2.

* cited by examiner

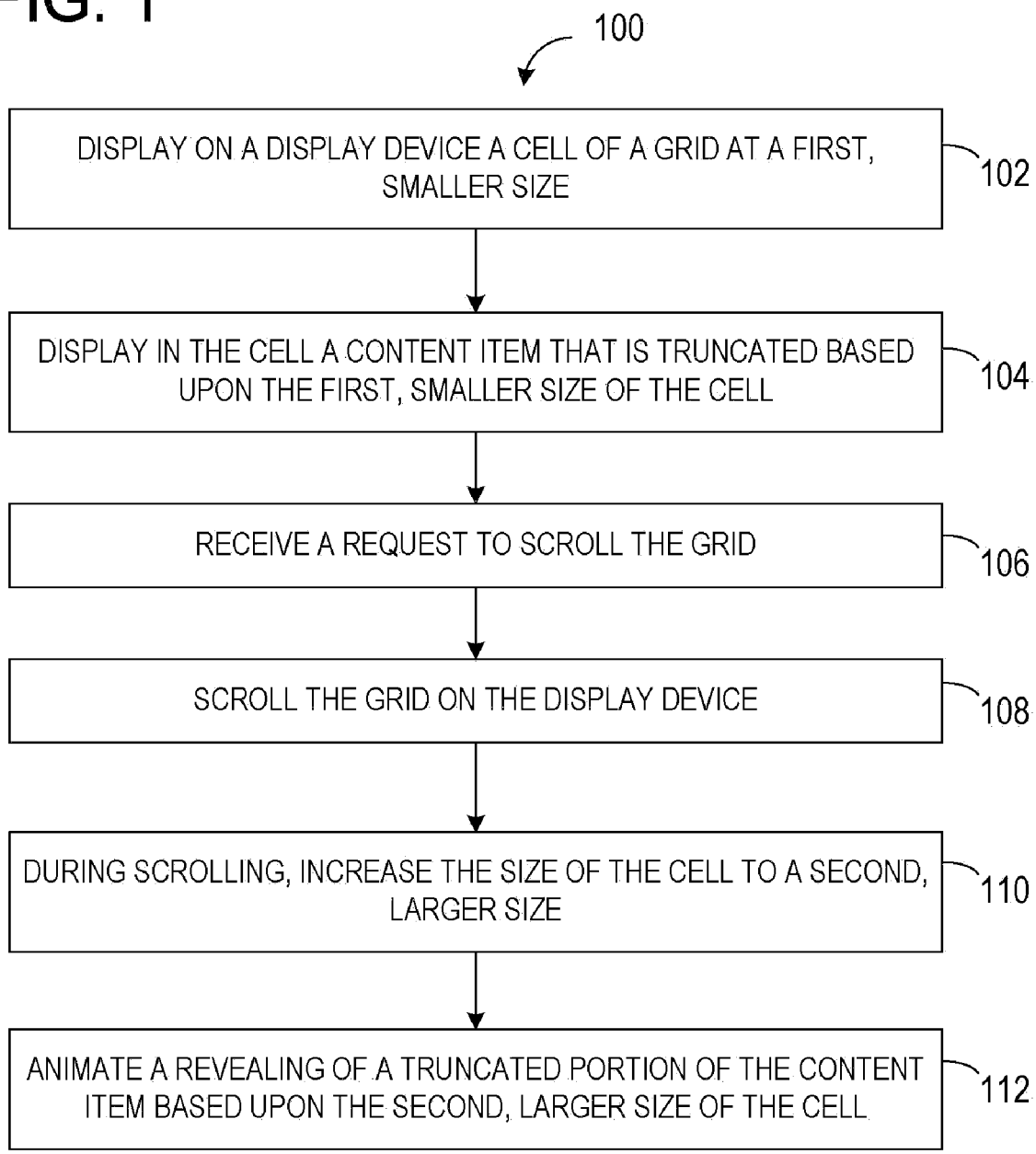

FIG. 2

| | COLUMN 2 | COLUMN 3 | COLUMN 4 |
|---|---|---|---|
| ROW 1 | CONTENT 3 | CONTENT 5 | CONTENT 8 |
| ROW 2 | < CONTENT C | CONTENT 6 | CONTENT 9 |
| ROW 3 | CONTENT 4 | CONTENT 7 | CONTENT 10 |

FIG. 3

| | COLUMN 2 | COLUMN 3 | COLUM |
|---|---|---|---|
| ROW 1 | CONTENT 3 | CONTENT 5 | CONTE |
| ROW 2 | < CONTENT C | CONTENT 6 | CONTE |
| ROW 3 | CONTENT 4 | CONTENT 7 | CONTE |

—SCROLL→

FIG. 4

| | COLUMN 2 | COLUMN 3 |
|---|---|---|
| ROW 1 | CONTENT 3 | CONTENT 5 |
| ROW 2 | < CONTENT C | CONTENT 6 |
| ROW 3 | CONTENT 4 | CONTENT 7 |

—ENDING SCROLL→

FIG. 5

| | COLUMN 1 | COLUMN 2 | COLUMN 3 |
|---|---|---|---|
| ROW 1 | CONTENT 1 | CONTENT 3 | CONTENT 5 |
| ROW 2 | | < CONTENT CONTEN | CONTENT 6 |
| ROW 3 | CONTENT 2 | CONTENT 4 | CONTENT 7 |

FIG. 6

| | COLUMN 1 | COLUMN 2 | COLUMN 3 |
|---|---|---|---|
| ROW 1 | CONTENT 1 | CONTENT 3 | CONTENT 5 |
| ROW 2 | CONTENT CONTENT | | CONTENT 6 |
| ROW 3 | CONTENT 2 | CONTENT 4 | CONTENT 7 |

FIG. 7

| | COLUMN 2 | COLUMN 3 | COLUMN 4 |
|---|---|---|---|
| ROW 1 | CONTENT 3 | CONTENT 5 | CONTENT 8 |
| ROW 2 | < CONTENT C | CONTENT 6 | CONTENT 9 |
| ROW 3 | CONTENT 4 | CONTENT 7 | CONTENT 10 |

FIG. 8

| | MN 1 | COLUMN 2 | COLUMN 3 | COLUN |
|---|---|---|---|---|
| ROW 1 | | CONTENT 3 | CONTENT 5 | CONTE |
| ROW 2 | < CONTENT CONTENT | CONTENT 6 | CONTE |
| ROW 3 | | CONTENT 4 | CONTENT 7 | CONTE |

—SCROLL→

FIG. 9

| | COLUMN 1 | COLUMN 2 | COLUMN 3 |
|---|---|---|---|
| ROW 1 | | CONTENT 3 | CONTENT 5 |
| ROW 2 | < CONTENT CONTENT | | CONTENT 6 |
| ROW 3 | | CONTENT 4 | CONTENT 7 |

—ENDING SCROLL→

FIG. 10

| | COLUMN 1 | COLUMN 2 | COLUMN 3 |
|---|---|---|---|
| ROW 1 | CONTENT 1 | CONTENT 3 | CONTENT 5 |
| ROW 2 | CONTENT CONTENT | | CONTENT 6 |
| ROW 3 | CONTENT 2 | CONTENT 4 | CONTENT 7 |

REVEALING OF TRUNCATED CONTENT ON SCROLLABLE GRID

BACKGROUND

Various types of content may be displayed on a computing device as two axes of information organized into a grid layout of cells such that each cell contains a content item. Such a grid may be used for calendar views, television schedules and other types of schedules, timelines and spreadsheets.

In some cases, a grid of information displayed on a computing device may be uniform in that the cells are equal in size. In other cases, a grid may be non-uniform in that the cells are of different sizes, and start and/or end in different locations along the axes of information. Depending on the size of a given cell, a content item displayed within that cell may be truncated based on the size of the cell.

SUMMARY

Various embodiments related to the revealing of truncated content on a scrollable grid of content are disclosed herein. For example, one disclosed embodiment provides a computing device comprising a display, a processor, and memory comprising instructions executable by the processor to display a cell of a grid of content at a first, smaller size and display in the cell a content item that is truncated based upon the first, smaller size of the cell. The computing device is further configured to receive a request to scroll the grid, and scroll the grid on the display device. During scrolling, the size of the cell is increased to a second, larger size, and a revealing of a truncated portion of the content item is animated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a flow diagram showing an embodiment of a method of presenting a scrollable grid of content on a display device and revealing a truncated portion of a content item in a grid cell during scrolling.

FIG. 2 is a schematic depiction of an embodiment of a non-uniform grid of content displayed on a display device, showing a non-uniform cell at a first, smaller size and containing a truncated content item.

FIG. 3 illustrates a scrolling of the grid and expansion of the non-uniform cell of FIG. 2.

FIG. 4 illustrates the non-uniform cell of FIG. 2 at a second, larger size.

FIG. 5 illustrates an embodiment of an animated revealing of truncated content of the non-uniform cell of FIG. 2.

FIG. 6 illustrates the non-uniform cell of FIG. 2 after the truncated content has been revealed FIG. 7 is a schematic depiction of another embodiment of a grid of content displayed on a display device.

FIGS. 8-10 illustrate the animated revealing of truncated content of a non-uniform cell of the grid of FIG. 7 during scrolling of the grid.

DETAILED DESCRIPTION

Figure 11:
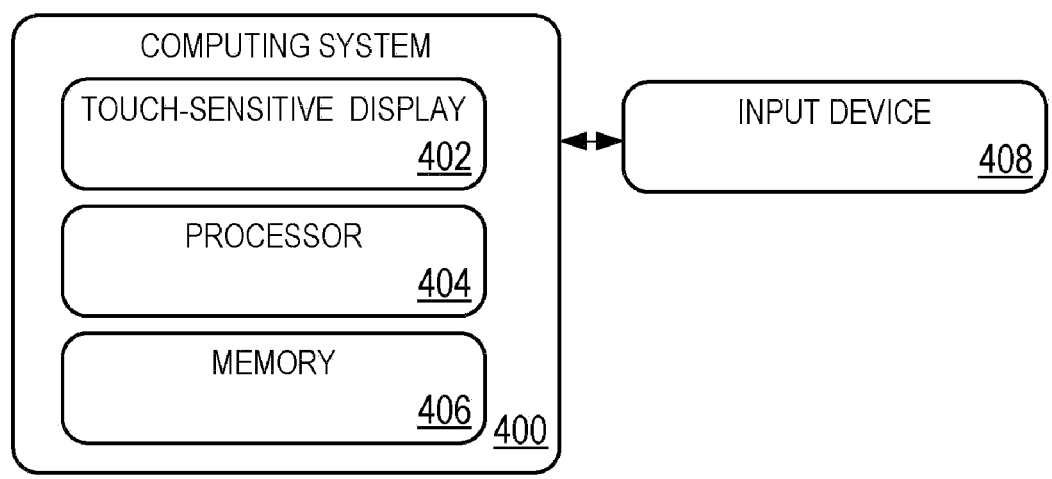
FIG. 11 is a block diagram of an embodiment of a computing device on which a grid may be displayed and updated.

As described above, various types of content may be displayed on a computing device as a grid of information. In some cases, including but not limited to media programming guides, spreadsheets with merged cells, etc., such grids may be non-uniform in that not all grids share common side boundaries. Therefore, content items in the grid may be affected in different manners by a scrolling operation, depending upon the size and boundary locations of the cell in which the content items are found. For example, where a grid is being scrolled from left to right, (i.e. to reveal earlier time slots in a media programming guide), content in a cell may either be moved from left to right across the grid where the left boundary of the cell is visible, or may remain in place where the left boundary of the cell has not yet come into view. In the case where the left boundary has not yet come into view, the size of the cell increases as left-to-right scrolling continues, thereby allowing the cell to hold more displayed content. In this case, truncated content, such as movie titles, etc., that did not fit in the cell at a smaller size may fit within the cell at the larger size. Therefore, various embodiments are disclosed herein related to the revealing of truncated content in a grid during scrolling.

FIG. 1 shows a flow diagram depicting an embodiment of a method 100 of updating a cell of a grid during scrolling of the grid. Prior to discussing the method 100, it will be understood that the grid may be any suitable type of grid, including uniform and non-uniform grids, and may contain any suitable type of content. For example, in some embodiments, a non-uniform grid of content may be a media programming guide. In other embodiments, the non-uniform grid may be any other suitable grid having two axes of information, such as a calendar, a meeting schedule, a spreadsheet, a project management timeline or the like. The term "non-uniform" as used herein refers to a grid having cells that are of different sizes, and start and/or end in different locations along one or more axes of information. In yet other embodiments, a grid may begin as a uniform grid, and become a non-uniform grid upon having one or more of its cells adjusted in length and/or width. As one specific example, a spreadsheet may be converted from a uniform grid to a non-uniform grid by merging cells. Further, while the illustrative embodiments disclosed herein are shown in terms of having cells that are non-uniform and/or content that is truncated in a horizontal scrolling direction, it will be understood that a grid also may be scrollable in a vertical direction and have cells that change in size during vertical scrolling. Additionally, the concepts disclosed herein also may be used with uniform grids that have truncated content revealed during either a horizontal or vertical scrolling operation.

Continuing with FIG. 1, method 100 first includes, at 102, displaying on a display device a cell of a grid at a first, smaller size. Depending on the size of a given cell, a content item displayed within that cell may be truncated based on the size of the cell. Thus, at 104, method 100 includes displaying in the cell a content item that is truncated based upon the first, smaller size of the cell. For example, in the case of the grid being a television programming guide, the content item may be movie title of a length longer than the time slot being viewed on the grid. Thus the movie title may be truncated within that timeslot.

Next, at 106, method 100 includes receiving a request to scroll the grid. In some cases, such a request may be received from an input device such as a mouse, touchpad, trackball, etc. In other cases, the display device may be a touch-sensitive display device, such that a request to scroll the grid may be received from an object configured to interact with the display device, such as a user's finger, a stylus, etc.

Upon receiving the request to scroll the grid, at 108 method 100 next includes scrolling the grid on the display device. For such input devices as described above, scrolling the grid may include scrolling by tracking the motion of a cursor displayed on the display device that is controlled by a mouse, touchpad, trackball or other such input device. Likewise, where the display device is a touch-sensitive display device, the scrolling may track a movement of a location of the user's finger on the touch-sensitive display device. Further, in some embodiments, scrolling the grid may include inertially scrolling the grid, where scrolling continues after cessation of a touch input at a rate initially proportional to the speed of the motion of the touch input across the display surface. It will be understood that the term "scrolling" as used herein may denote pixel-by-pixel scrolling, rather than discrete scrolling that jumps between boundaries defined by the grid. Such pixel-by-pixel scrolling may appear as a smooth, continuous movement of the grid, whereas discrete scrolling between grid boundaries may appear to be a more discontinuous, choppier movement.

Next, at 110, method 100 includes, during scrolling, increasing the size of the cell to a second, larger size. For example, in the case of the media programming guide discussed above, scrolling may include viewing programming at prior and/or upcoming times by scrolling the grid to display programming at these other times. Further, in some embodiments, the size of the cell may be increased to the second, larger size by scrolling in a horizontal direction and by increasing a horizontal size of the cell. In other embodiments, the size of the cell may be increased to the second, larger size by scrolling in a vertical direction and by increasing a vertical size of the cell.

Next, at 112, method 100 includes animating a revealing of a truncated portion of the content item based upon the second, larger size of the cell. For example, the second, larger size of the cell may allow more of a content item to be shown within the cell than allowed by the first, smaller size of the cell. In the case of the truncated movie title described above, a user may have scrolled to view an additional hour of the media programming guide and as such, increased the cell size displaying the movie title. This allows a previously truncated portion of the title to now be revealed. Currently, such grids often simply refresh content shown in such a cell after the cell expands. This may appear to a user as a sudden, discontinuous process. By animating the revealing of the content (such that the truncated content is progressively brought into view), a smoother user experience may be provided.

In some embodiments, animating the revealing of the truncated portion of the content item may include revealing the truncated portion upon completion of scrolling. An example of such an embodiment is shown in FIGS. 2 through 6. FIG. 2 shows a schematic depiction of an embodiment of a grid 200 displayed on a display device 202. Grid 200 displays information indexed by column headings COLUMN 2, COLUMN 3, and COLUMN 4, and row headings ROW 1, ROW 2 and ROW 3. Each intersection of a row and a column of grid 200 defines a cell. One such cell, namely cell 204, displays a content item 206 that is truncated due to the smaller size of cell 204, wherein the truncation is illustrated with a "<" symbol.

Next, FIG. 3 shows a schematic depiction of grid 200 during scrolling from left to right, and illustrates that the size of cell 204 shown in FIG. 2 has been increasing toward a larger size. As shown, content item 206 has remained of a same size as that shown in FIG. 2. Further, content item 206 has remained in a same position relative to COLUMN 2 as the cell 204 expanded.

FIG. 4 shows a schematic depiction of grid 200 displayed on display device 202, wherein scrolling is coming to an end (i.e. approaching a left boundary of column 1). Upon completing the scrolling action, the scroll may conclude with a snapping animation, where the snapping animation adjusts the grid to automatically stop scrolling at a nearest grid unit location. For example, in the case of the media programming guide discussed above, although a scroll may come to an end at 8:17 p.m., the scroll may conclude a snapping animation that snaps the grid to a nearest grid unit location, such as 8:30 p.m.

Accordingly, at a next time step, FIG. 5 shows a schematic depiction of grid 200 displayed on display device 202, where the grid has now snapped to a nearest grid unit location. Cell 204 of FIG. 4 has now increased to a second, larger size compared to that shown in FIG. 2. FIG. 5 further shows the content item 206 of cell 210 being animated to the left, toward a left boundary of cell 204. Such an animation reveals a truncated portion of content item 206. FIG. 6 shows a schematic depiction of grid 200 displayed on display device 202, where the animation depicted in FIG. 5 is complete. A remaining truncated portion of the content item 206 is shown as fully revealed, and therefore cell 204 displays a content item 206 that is no longer truncated.

As described above and shown in FIGS. 2-6, in some embodiments of method 100, animating a revealing of a truncated portion of a content item may include revealing the truncated portion upon completion of scrolling. In other embodiments of method 100, animating a revealing of a truncated portion of a content item may include revealing the truncated portion of the content item continuously as the cell expands from the first, smaller size to the second, larger size during scrolling. An example of such an embodiment is shown in FIGS. 7 through 10.

First, FIG. 7 shows a schematic depiction of an embodiment of a grid 300 displayed on a display device 302. Grid 300 displays information in cells indexed by columns and rows as described above in the case of grid 200 shown in FIGS. 2-6. Grid 300 contains cell 304, displaying a content item 306 that is truncated due to the smaller size of cell 304.

Next, FIG. 8 shows the size of cell 304 to increase to a larger size during scrolling. Further, as cell 304 continuously expands during scrolling, a truncated portion of content item 306 is continuously revealed during scrolling. In some embodiments, the truncated portion may be animated to be revealed at a rate based on an expansion rate at which the cell increases from the first, smaller size to the second, larger size. This rate may be equal to the rate of cell size expansion, proportional to the rate of cell size expansion, or have any other suitable relationship to the rate of cell size expansion.

FIG. 9 shows grid 300 at a time when scrolling is nearing an end at a grid unit location. Upon completing the scroll, the scrolling motion may conclude with a snapping animation, where the snapping animation adjusts the grid to automatically stop scrolling at a nearest grid unit location. In other embodiments, the grid may cease scrolling at a location between grid unit locations.

Next, FIG. 10 shows a schematic depiction of grid 300 displayed on display device 302, where the grid has stopped scrolling at a nearest grid unit location and scrolling is complete. Cell 304 of FIG. 9 has now increased to a second, larger size, and a remaining truncated portion of the content item 306 has been revealed.

FIG. 11 is a block diagram of a computing device 400 suitable for use with a method of presenting a scrollable non-uniform grid of content on a display device and updating a cell of the non-uniform grid during scrolling of the grid. Computing device 400 comprises an input device in the form of a touch-sensitive display 402, a processor 404, and memory 406 comprising instructions executable by processor 404 to perform a method of revealing truncated content during a scrolling of a grid of content, such as the embodiments described herein. Computing device 400 also may accept input from another input device 408 than display 402, such as a mouse, trackball, touch pad, or other such cursor control device.

It will be appreciated that the computing device 400 may be any suitable computing device configured to perform the methods described herein via the execution of programs. For example, the computing devices may be a mainframe computer, personal computer, laptop computer, personal digital assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device, comprising:
   a display device;
   a processor; and
   memory comprising instructions executable by the processor to:
   display on the display device a cell of a grid at a first, smaller size;
   display in the cell a content item that is truncated based upon the first, smaller size of the cell;
   receive a request to scroll the grid;
   scroll the grid on the display device;
   during scrolling, increase the size of the cell in a first direction relative to other cells to a second, larger size while not increasing the size of the cell in another direction transverse to the first direction; and
   animate a revealing of a truncated portion of the content item based upon the second, larger size of the cell.

2. The device of claim 1, wherein the grid is a non-uniform grid of content.

3. The device of claim 1, wherein the instructions are executable to increase the size of the cell to the second, larger size by scrolling in a horizontal direction and by increasing a horizontal size of the cell.

4. The device of claim 1, wherein the instructions are executable to increase the size of the cell to the second, larger size by scrolling in a vertical direction and by increasing a vertical size of the cell.

5. The device of claim 1, wherein the instructions are executable to animate the revealing of the truncated portion of the content item by revealing the truncated portion upon completion of scrolling.

6. The device of claim 1, wherein the instructions are executable to animate the revealing of the truncated portion of the content item by revealing the truncated portion of the content item continuously as the cell expands from the first, smaller size to the second, larger size during scrolling.

7. The device of claim 6, wherein the instructions are further executable to animate a revealing of the truncated portion at a rate based on an expansion rate at which the cell increases from the first, smaller size to the second, larger size.

8. The device of claim 1, wherein the instructions are executable to scroll the grid on the display device and conclude with a snapping animation, the snapping animation adjusting the grid to automatically stop scrolling at a nearest grid unit location.

9. The device of claim 1, wherein the grid comprises a media programming guide.

10. A computer-readable storage medium comprising instructions stored thereon that are executable by a computing device to perform a method of presenting a scrollable non-uniform grid of content on a display device and updating content of a cell of the non-uniform grid of content during scrolling of the non-uniform grid of content, the method comprising:
    displaying on the display device the cell of the non-uniform grid of content at a first, smaller size;
    displaying in the cell a content item that is horizontally truncated based upon the first, smaller size of the cell;
    receiving a request to scroll the non-uniform grid of content;
    horizontally scrolling the non-uniform grid of content on the display device;
    during scrolling, horizontally increasing the size of the cell to a second, larger size; and
    during horizontally increasing the size of the cell, updating the content item via an animation to reveal a truncated portion of the content item, the truncated portion of the content item being revealed as the size of the cell increases from the first, smaller size to the second, larger size during scrolling.

11. The device of claim 10, wherein the non-uniform grid of content comprises a media programming guide.

12. The device of claim 10, wherein the instructions are executable to increase the size of the cell to the second, larger size by scrolling in a horizontal direction and increasing a horizontal size of the cell.

13. The device of claim 10, wherein the instructions are executable to increase the size of the cell to the second, larger size by scrolling in a vertical direction and increasing a vertical size of the cell.

14. The device of claim 10, wherein the instructions are further executable to animate a revealing of the truncated portion at a rate based on an expansion rate at which the cell increases from the first, smaller size to the second, larger size.

15. The device of claim 10, wherein the instructions are executable to scroll the non-uniform grid of content on the display device and conclude with a snapping animation, the snapping animation adjusting a grid border to be pulled to a nearest predetermined grid unit location and to be displayed at that nearest predetermined grid unit location.

16. A method of presenting a scrollable non-uniform grid of content in the form of a media programming guide on a touch-sensitive display device and updating content of a cell of the non-uniform grid during scrolling of the grid, the method comprising:

displaying on the touch-sensitive display device the cell of the non-uniform grid at a first, smaller size;

displaying in the cell a content item that is truncated based upon the first, smaller size of the cell;

receiving a request to scroll the non-uniform grid via a user's finger interacting with the touch-sensitive display device;

horizontally scrolling the non-uniform grid on the touch-sensitive display device, the non-uniform grid scrolling in response to a location of the user's finger on the touch-sensitive display device;

during scrolling, horizontally increasing a size of the cell to a second, larger size; and during horizontally increasing the size of the cell, animating a revealing of a truncated portion of the content item as the size of the cell increases from the first, smaller size to the second, larger size.

17. The method of claim 16, wherein increasing the size of the cell to the second, larger size comprises scrolling in a horizontal direction and increasing a horizontal size of the cell.

18. The method of claim 16, wherein increasing the size of the cell to the second, larger size comprises scrolling in a vertical direction and increasing a vertical size of the cell.

19. The method of claim 16, wherein scrolling the non-uniform grid on the display device concludes with a snapping animation, the snapping animation adjusting a grid border to be pulled to a nearest predetermined grid unit location.

20. The method of claim 16, further comprising animating a revealing of the truncated portion at a rate based on an expansion rate at which the cell increases from the first, smaller size to the second, larger size.

\* \* \* \* \*